US008611321B2

(12) United States Patent
Herrala et al.

(10) Patent No.: US 8,611,321 B2
(45) Date of Patent: Dec. 17, 2013

(54) LOCATION TRACKING SYSTEM

(75) Inventors: Sami Herrala, Oulu (FI); Jari Kylmänen, Kiviniemi (FI); Teemu Sivonen, Oulu (FI)

(73) Assignee: 9Solutions Oy, Oulu (FI)

( * ) Notice: Subject to any disclaimer, the term of this patent is extended or adjusted under 35 U.S.C. 154(b) by 266 days.

(21) Appl. No.: 12/974,221

(22) Filed: Dec. 21, 2010

(65) Prior Publication Data

US 2011/0211563 A1    Sep. 1, 2011

(30) Foreign Application Priority Data

Dec. 22, 2009 (EP) .................................. 09180268

(51) Int. Cl.
*C12Q 1/68* (2006.01)

(52) U.S. Cl.
USPC .......................................................... 370/338

(58) Field of Classification Search
USPC .......................................................... 370/338
See application file for complete search history.

(56) References Cited

U.S. PATENT DOCUMENTS

| 2004/0193449 | A1 | 9/2004 | Wildman et al. |
| 2005/0075116 | A1 | 4/2005 | Laird et al. |
| 2005/0099293 | A1 | 5/2005 | Tyroler |
| 2005/0242948 | A1 | 11/2005 | Tarr |
| 2006/0071790 | A1 | 4/2006 | Duron et al. |
| 2007/0001904 | A1 | 1/2007 | Mendelson |
| 2008/0160985 | A1 | 7/2008 | Variyath et al. |
| 2009/0146817 | A1* | 6/2009 | Ikeda .......................... 340/572.1 |
| 2009/0201850 | A1* | 8/2009 | Davis et al. .................... 370/328 |
| 2009/0224909 | A1 | 9/2009 | Derrick et al. |
| 2009/0235176 | A1* | 9/2009 | Jayanthi ........................ 715/738 |
| 2009/0318779 | A1* | 12/2009 | Tran .............................. 600/301 |
| 2010/0148961 | A1* | 6/2010 | Raphaeli ........................ 340/552 |
| 2010/0176941 | A1* | 7/2010 | Jain et al. ................. 340/539.13 |
| 2010/0201488 | A1* | 8/2010 | Stern et al. ................... 340/10.1 |

FOREIGN PATENT DOCUMENTS

| WO | 2005/062066 A2 | 7/2005 |
| WO | 2007/034281 A1 | 3/2007 |

OTHER PUBLICATIONS

European Search Report for EP 09 18 0268 dated Jul. 22, 2010.
Partial European Search Report for EP 09 18 0268 dated May 7, 2010.
European Office Action dated Dec. 5, 2012 issued in European Patent Application No. 09 180 268.6.

* cited by examiner

*Primary Examiner* — Mark Rinehart
*Assistant Examiner* — Ellen A Kirillova
(74) *Attorney, Agent, or Firm* — Sughrue Mion, PLLC

(57) ABSTRACT

This document presents a location tracking system. Transmitter tags are disposed throughout the area where the location tracking is carried out. The transmitter tags are configured to transmit their unique identifiers. A personal radio communication device being tracked detects a unique identifier received from a transmitter tag and transmits the detected unique identifier to a server. The server links a known physical location associated with the unique identifier to an identifier of the personal radio communication device so as to carry out location tracking.

14 Claims, 3 Drawing Sheets

LOCATION TRACKING SYSTEM

FIELD

The invention relates to the technical field of location tracking systems.

BACKGROUND

Prior art teaches several types of location tracking systems. Satellite based tracking systems, e.g. Global Positioning System (GPS), are probably the most common location tracking systems. However, their problem is that they are not suitable for indoor location tracking, because GPS signals do not penetrate building walls. For indoors location tracking, prior art teaches systems that utilize a pico network of wireless base stations, and the location of a given person in the coverage area of the pico network is determined on the basis of which wireless base station currently serves a personal communication device of the person. A problem with such systems is that if high resolution is needed for the tracking, numerous base stations have to be disposed throughout the area where the location tracking is to be carried out. This leads to high installation and maintenance costs.

BRIEF DESCRIPTION

According to an aspect of the present invention, there is provided a system for tracking location, comprising: a plurality of transmitter tags disposed to cover an area where the location tracking is to be carried out, wherein each transmitter tag is configured to radio transmit a unique identifier; at least one personal radio communication device configured to scan for radio transmissions, to detect at least one unique identifier transmitted by at least one transmitter tag close to the location of the personal radio communication device, and to transmit a message comprising at least one of the detected unique identifiers to a server over a communication connection established between the personal radio communication device and the server; and the server configured to receive messages from the at least one personal radio communication device, each message comprising at least one unique identifier of at least one transmitter tag, to link a preconfigured location of a given transmitter tag, determined from the received message, with the personal radio communication device from which the message was received so as to determine the location of the personal radio communication device, and to store an identifier of the personal radio communication device as linked to the determined location of the personal radio communication device.

According to another aspect of the present invention, there is provided an apparatus functioning as a server comprising: at least one processor; and at least one memory including a computer program code, wherein the at least one memory and the computer program code are configured, with the at least one processor, to cause the server to: operate in a location tracking system comprising a plurality of transmitter tags disposed to cover an area where the location tracking is to be carried out, wherein each transmitter tag is configured to radio transmit a unique identifier, and at least one personal radio communication device configured to scan for radio transmissions, to detect at least one unique identifier transmitted by at least one transmitter tag close to the location of the personal radio communication device, and to transmit a message comprising at least one of the detected unique identifiers; receive messages from the at least one personal radio communication device, each message comprising at least one unique identifier of at least one transmitter tag, to link a preconfigured location of a given transmitter tag, determined from the received message, with the personal radio communication device from which the message was received so as to determine the location of the personal radio communication device, and to store an identifier of the personal radio communication device as linked to the determined location of the personal radio communication device.

According to another aspect of the present invention, there is provided a personal radio communication device of a location tracking system, comprising: at least one processor; and at least one memory including a computer program code, wherein the at least one memory and the computer program code are configured, with the at least one processor, to cause the personal radio communication device to: scan for radio transmissions; detect at least one unique identifier transmitted by at least one transmitter tag close to the location of the personal radio communication device, wherein the at least one transmitter tag disposed to cover an area where the location tracking is to be carried out, wherein each transmitter tag is configured to radio transmit a unique identifier, and transmit a message comprising at least one of the detected unique identifiers to a server over a communication connection established between the personal radio communication device and the server.

Embodiments of the invention are defined in the dependent claims.

LIST OF DRAWINGS

Embodiments of the present invention are described below, by way of example only, with reference to the accompanying drawings, in which FIG. 1 illustrates a layout of an area where location tracking is carried out and coverage of a tracking system according to an embodiment of the invention;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
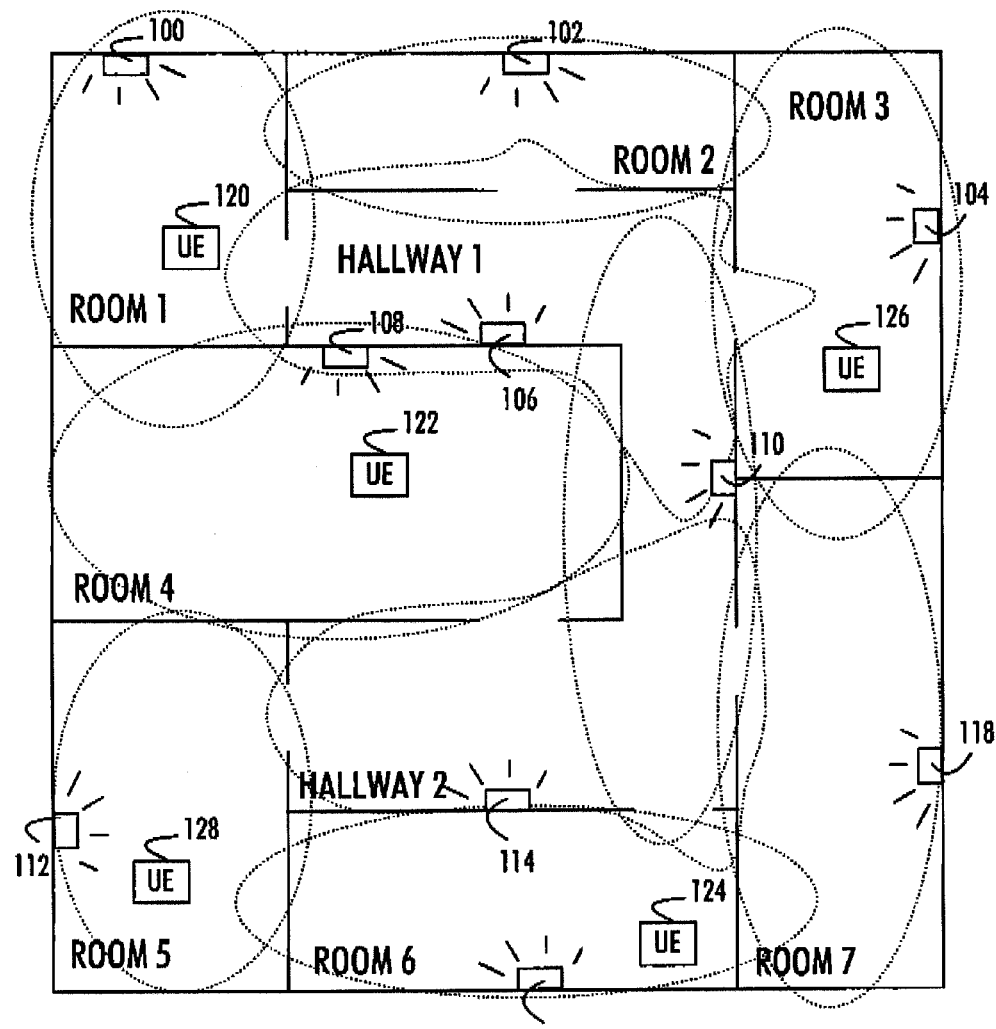

FIG. 1 illustrates a layout of a building to which embodiments of the invention may be applied. The embodiments are particularly suitable for indoor location tracking, but the invention may equally be utilized in outdoor applications. The layout of FIG. 1 illustrates a number of rooms with doors illustrated by discontinuities in the room walls, and a hallway providing access from one room to another. People inside the building are represented by their user equipment 120, 122, 124, 126, and 128.

The location tracking is enabled by disposing a plurality of transmitter tags 100 to 118 throughout the building where the location tracking is to be carried out. The transmitter tag 100 to 118 may comprise a simple electronic circuitry inside a casing where the electronic circuitry is configured to broadcast/transmit a unique identifier (ID) on a radio frequency. The radio access technology with which the transmitter tags 100 to 118 transmit their unique ID may be based on Bluetooth class 1, 2 or 3 (depending on the desired coverage area, power consumption, etc.), and the transmitter tags may be configured to transmit Bluetooth inquiry responses continuously, wherein the inquiry responses comprise the unique ID. Each transmitter tag 100 to 118 has a unique ID, and the transmitter tags 100 to 118 each transmit the inquiry responses continuously. Obviously, the present invention is not limited to the use of the Bluetooth technology in order to transmit or broadcast the unique IDs, and other radio access schemes are utilized in other embodiments.

The pieces of user equipment 120 to 128 carried by the users are mobile and equipped with a capability for using the same radio access scheme as the transmitter tags use, e.g. Bluetooth. The user equipment may, however, utilize a different Bluetooth classification, e.g. class 1 to provide a higher operative range. In consequence, each piece of user equipment is able to detect the unique IDs transmitted by the transmitter tags 100 to 118. The user equipment is configured to scan for radio transmissions, to detect at least some of the unique identifiers broadcasted by the transmitter tags, to select one of the detected unique identifiers according to a determined criterion, and to transmit the selected unique identifier to a server over a communication connection established between the user equipment and the server. The criterion for selecting the unique identifier may be the highest reception power level. The user equipment may be configured to select the unique identifier which is received with the highest reception power. As a result, the unique identifier of the closest transmitter tag will typically be selected.

The server stores a database comprising the layout of the area to be monitored, the physical locations of the transmitter tags in the area, wherein a location identifier (a room number, coordinates, or another identifier) is associated with the unique identifier of the transmitter tag disposed at that location. In consequence, when the server receives a unique identifier from given user equipment, it maps an identifier of the user equipment with the location identifier through the unique identifier of the transmitter tag received from the user equipment. When the user equipment 120 to 128 periodically transmits the unique identifiers of the detected transmitter tags, the server is capable of tracking the locations of the users carrying the user equipment 120 to 128.

In another embodiment, the user equipment is configured to transmit all detected unique identifiers to the server together with a quality metric indicating the signal quality of each signal carrying a detected unique identifier. Such a signal quality metric may be the reception power, signal-to-noise ratio, estimated bit error rate, or any other signal quality metric known in the art. On the basis of the unique identifiers and associated signal quality metrics received from the user equipment, the server may deduce the location of the user equipment by using the locations of the detected transmitter tags, associated signal quality metrics, and/or the last recorded location of the user equipment. This improves the resolution of the location determination. The determination of the transmitter tag associated with the highest signal quality metric indicates the closest transmitter tag but the identifiers of the other detected transmitter tags may provide extra information as to in which direction from the closest transmitter tag the user equipment currently resides. The last known location of the user equipment further improves the accuracy of the location tracking.

Since the transmitter tags are both structurally and operationally low-complexity devices, their manufacturing costs are very low. Therefore, even coverage of vast areas with such devices does not raise the expenses of the location tracking system according to the invention significantly. Maintenance is also simple and low-cost, as a broken transmitter tag may be replaced by a new one. The coverage area of each transmitter tag may be determined on the basis of the layout of the building (or the area). A small room may be covered by a single transmitter tag, while long hallways and large rooms may comprise a plurality of transmitter tags distributed over such an area. FIG. 1 illustrates the coverage areas of each transmitter tag by dotted lines. The actual shape and size of the coverage area of a given transmitter tag depends on the transmit power, an antenna radiation pattern, and the surroundings of the transmitter tag (walls, doors, etc.). The transmit power and/or the antenna radiation pattern of the transmitter tags may be adjusted during the installation process so that every location of the area will be covered. As illustrated in FIG. 1, the coverage areas of transmitter tags disposed close together may overlap. For example, the coverage areas of the transmitter tags 110, 114, and 118 overlap at the entry to room 7. This does not affect the operation of the location tracking in practice, because the coverage areas of the transmitter tags are quite low (adjustable radius of up to 10 meters with Bluetooth class 2), so the transmitter tags are disposed relatively close to each other, and the overlapping areas are only a fraction of the coverage area. If given user equipment sends a unique identifier of a transmitter tag which is not the closest one, the error in the location tracking may be considered as acceptable. However, the resolution may be improved, as described above.

Figure 2:
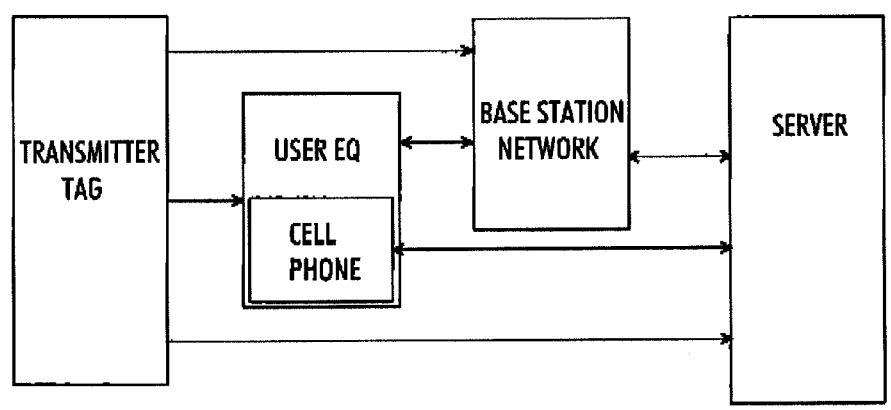
FIG. 2 illustrates embodiments for communicating between elements according to an embodiment of the invention.

FIG. 2 illustrates examples of routing signals between the elements of the system according to an embodiment of the present invention. As already mentioned, the transmitter tag(s) may transmit the unique IDs by utilizing Bluetooth inquiry responses or other connectionless means for radio transmitting/broadcasting a unique identifier without establishing an actual radio connection. The user equipment is capable of detecting the radio transmissions/broadcasts of the transmitter tags so as to detect the unique identifiers. The user equipment may forward the detected unique identifiers to the servers over a public land mobile telecommunication network, e.g. an Internet protocol (IP) connection established over a cellular system such as a GSM-, CDMA-, or UMTS-based mobile communication system. Alternatively, the user equipment may communicate with the server through a private base station network, e.g. a pico network, realized by a network of private base stations distributed to cover the area where the location tracking is being carried out. The private base station network may establish a wireless mesh network based on the Bluetooth technology, for example, and configured to route signals through a plurality of base stations between a plurality of user equipment and the server. One or more of the base stations may be connected to a wired network, e.g. Ethernet, so as to connect to the server. If the server is located in a remote location, the connection between the base station network and the server may be routed through the Internet. Other embodiments may utilize other communication technologies to implement the mesh network, such as IEEE 802.11x (WiFi).

In order to transmit the detected unique identifier to the server, the user equipment may include a control circuitry which configures the user equipment to establish a transport connection with the server through the mobile communication network or through the base station network. When the mobile communication network is used, the control circuitry may be configured to utilize a cell phone connected to the control circuitry. The cell phone may be in the same casing as the control circuitry. If the cell phone is physically separate to the control circuitry, the control circuitry may control the cell phone to establish the transport connection, for example, over a Bluetooth link established between the control circuitry and the cell phone. When the control circuitry establishes the transport connection through the private base station network, the utilization of the cell phone may be omitted, and the control circuitry may establish the transport connection with the same Bluetooth communication circuitry through which the unique identifier was received. As mentioned above, the private base station network may form a mesh network where the transport connection is routed from a private base station communicating directly with the user equipment over a Bluetooth radio link to another and so on until the route reaches a private base station connected to the server over a wired connection. In some embodiments, the server may be equipped with a wireless communication capability, and all the links of the transport connection between the user equipment and the server may be radio links. The advantage of utilizing a private base station network instead of a public mobile communication network is that it is independent of other traffic. In consequence, the location tracking is not hindered by congestions in the public mobile communication networks.

In some embodiments, the transmitter tags are equipped with other functionalities, and they may be further configured to transmit signals to the server either directly, through the private base station network, or even by using the user equipment as a bridge. Such embodiments are described in greater detail later.

Figure 3:
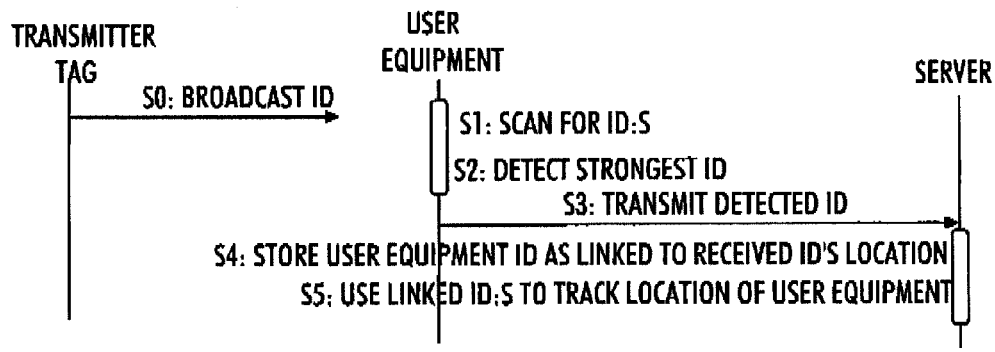
FIG. 3 is a signaling diagram illustrating location tracking according to an embodiment of the invention.
Figure 4:
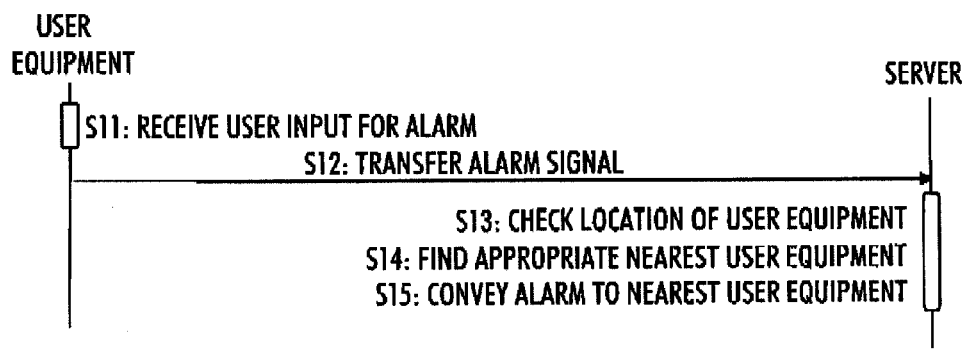
FIG. 4 is a signaling diagram illustrating utilization of the location tracking according to an embodiment of the invention.

FIG. 3 is a signaling diagram illustrating the location tracking procedure, and FIG. 4 illustrates an exemplary practical utilization of the location tracking. Before executing the flow diagram of FIG. 3, the transmitter tags have been disposed throughout the area where the location tracking is being carried out, and the physical locations of the transmitter tags have been stored in a database as linked with the IDs of the transmitter tags. The database is accessible by the server and, thus, the server knows the physical location of each transmitter tag. Referring to FIG. 3, a transmitter tag transmits/broadcasts its unique ID in S0. Let us in this example assume that both the transmitter tags and the user equipment utilize Bluetooth technology. Let us further assume that the user equipment has established a transport connection to the server. This may include communication with the serving private base station network, as necessary. In S1, the user equipment scans for transmitter tag IDs. The user equipment activates the Bluetooth reception circuitry so as to scan for Bluetooth inquiry signals. In order to avoid confusion with Bluetooth devices other than the transmitter tags, the user equipment may store a database comprising the IDs of the transmitter tags, and the scanning is carried out in order to search for the IDs of the transmitter tags. The IDs of the transmitter tags stored in the database may be received from the server over the wireless communication connection, and/or they may be stored during the setup of the user equipment. In an embodiment, the server adaptively transmits a candidate list comprising the IDs of the transmitter tags in the neighborhood of the user equipment on the basis of the determined location and/or movement of the user equipment. Then, the user equipment only scans for those IDs most recently received from the server. The user equipment does not have to scan for every possible ID, which reduces the complexity of the scanning. The server may select the IDs of the candidate list on the basis of different criteria. For example, the server may select the IDs on the basis of the movement of the user equipment such that the candidate list comprises the IDs of the tags in the direction of movement from a larger range than in the other directions. For example, the server may include in the candidate list IDs of the tags within 20 meter range in other directions and within 60 meter range in the direction of movement (the values are merely exemplary). In an embodiment, the server may omit from the candidate list IDs of those tags that are within the same range but that are not practically necessary for the location determination, e.g. the IDs of the tags in different floors than that where the user equipment currently resides, unless the user equipment is close to the stairway or elevator. When the Bluetooth reception circuitry detects a single unique ID of a given transmitter tag, the user equipment controls a Bluetooth transmission circuitry to transmit the unique ID to the server over the transport connection in S3. If in S2 a plurality of unique IDs have been detected, the user equipment runs a reception signal power estimation routine (or another signal quality metric estimation routine) so as to determine reception power levels (or another signal quality metric) of the signal carrying the detected unique IDs. A unique ID associated with the highest reception power level is then selected and transmitted to the server in S3. Other embodiments use other metrics for determining the strongest/closest transmitter tag may be used. In an embodiment, the transmitter tags are configured to respond to an inquiry message, e.g. a Bluetooth inquiry message, received from the user equipment, and the user equipment is configured to estimate the distance to the transmitter tag by transmitting an inquiry message to the transmitter tag whose ID was detected and to measure a time from the transmission of the inquiry message to the time of receiving the response to the inquiry message. The user equipment naturally subtracts from that time value an estimated time used for processing the inquiry and transmitting the response in the transmitter tag plus the time used for processing the response in the user equipment. In another embodiment, transmission power adjustment is utilized in the transmission of the inquiry messages. The user equipment is configured to transmit the inquiry message using determined transmission power. If the user equipment receives a response to the inquiry from one transmitter tag, the transmitter tag is selected as the closes transmitter tag, and its unique ID is transmitted to the server in S3. If the user equipment receives no responses, it retransmits the inquiry message using increased transmission power and so on until it receives a response. If the user equipment receives a response from multiple transmitter tags, the user equipment may be configured to retransmit the inquiry message using incrementally decreased transmission power until it receives a response from only one transmitter tag.

In S4, the server receives the unique ID from the user equipment and accesses the database, the database storing the identifiers of the plurality of user equipment each linked to a transmitter tag whose identifier the corresponding user equipment has previously transmitted to the server. The identifier of the user equipment may have been communicated to the server in connection with the establishment of the transport connection, and/or it may be communicated together with the unique identifier of the transmitter tag. In S4, the server reads the identifier of the user equipment from which the unique identifier was received and accesses a record of that user equipment. Then, the server checks whether or not the user equipment is already linked to the transmitter tag having the unique identifier just received. If the unique identifier linked to the user equipment in the record is the same as the received unique identifier, the server leaves the record intact, because there is no need to update the location of the user equipment. On the other hand, if the unique identifier linked to the user equipment in the record is different from the received unique identifier, the server updates the record by replacing the unique identifier currently linked to the identifier of the user equipment with the unique identifier just received. Accordingly, the location of the user is updated with a new location. The user equipment performs the location update by carrying out steps S1 to S3 periodically, e.g. once per minute or any other pre-defined time period, depending on the desired tracking accuracy. In an embodiment, the server sends no payload data back to the user equipment in response to the reception of the unique ID. Communication-related information, e.g. acknowledgment data indicating correct reception of data, may be transmitted in the downlink direction to the user equipment. Upon detection of a failure in the communication connection with the server, e.g. failure to receive the acknowledgment messages or any signal from the server, the user equipment may alert the user through the user interface so that the user becomes aware that the location tracking is not functioning properly.

In S5, the server utilizes the user equipment IDs linked to the transmitter tag IDs for tracking the locations of the user equipment in the area where the tracking is carried out. FIG. 4 illustrates a signaling diagram where the location tracking is utilized in case of an emergency. Let us assume a use case where the location tracking system is installed in a hospital, and the layout of FIG. 1 illustrates the floor plan of the hospital (or part of it). Let us further assume that a nurse carrying user equipment 122 and located currently in room 1 notices an emergency in the state of a patient. The nurse immediately enters an alarm input to his/her personal user equipment. Referring to FIG. 4, the user equipment 122 receives the user input for raising an alarm in S11. In response to the user input in S11, the user equipment is configured to transmit an alarm signal to the server in S12. The user equipment may utilize the same connection in S12 as it uses for transmitting the detected tag IDs in S3, e.g. the Bluetooth connection routed through the private base station network or the public mobile communication network. Upon reception of the alarm signal from the user equipment, the server checks the location of the user equipment in S13. S13 comprises accessing the database storing the user equipment identifiers linked to the tag IDs so as to determine the tag with which the user equipment is currently linked. Depending on the implementation, the server may also (or alternatively) check the database for a physical location, e.g. room number, coordinates, or another identifier, currently linked to the user equipment identifier so as to determine the actual physical location of the user equipment.

Upon determining the location of the user equipment, the server accesses the database so as to determine the nearest other user equipment in S14. The database may store means for determining the closest neighboring tags for any tag (or physical locations associated with any tag). The nearest tag may be determined by taking into account walls and access routes in the area so that the nearest tag is not necessarily the one having the shortest distance but the one having the shortest distance via access routes through which a human being can move. Referring to FIG. 1, the user equipment 122 requesting for help is currently linked to tag 108, and tag 108 has the shortest physical distance to tag 106, but only through the wall of the room 4. Therefore, the server does not consider tag 106 as the nearest tag. Instead, tag 114 is considered as the nearest tag. In consequence, the server may in S14 check whether or not there is any user equipment currently linked to that tag 114. As no user equipment is currently linked to the tag 114, the server checks for the next nearest tag, which is tag 112 in room 5. Then, the server discovers that user equipment 128 is currently linked to that tag 112. Thus, the user equipment 128 is determined to be the nearest user equipment, and the server is then configured to convey the alarm to the nearest user equipment 128 in S15. The server may transmit an alarm signal to the nearest user equipment through the same transport connection used for transferring the location tracking information (the tag IDs). The alarm may include an alarm message indicating the occurrence of the alarm together with physical location information, e.g. a room number, where help is needed. Upon reception of such an alarm message, the user equipment 128 receiving the alarm message is configured to present the alarm to the user through a user interface. The user equipment may display an alarm message and the location where help is needed on a display and sound an alarm tone through a loudspeaker. Accordingly, the user becomes aware of the alarm and is able to take measures to respond to the alarm. The user may control the user equipment to respond to the alarm either with acknowledgment or rejection. If the user acknowledges the alarm message, user equipment 128 transmits an acknowledgment message to the server as an indication that the user is on his/her way to help, and the server may end the alarm procedure. If the user rejects the alarm message, the user equipment 128 transmits a rejection message to the server, and the server returns to S14 to find the next nearest user equipment (user equipment 124 in FIG. 1), and to transmit the alarm message to the next nearest user equipment. In this manner, the procedure continues, until the server receives an acknowledgment message from an user equipment or until there are no more user equipment to alarm. The alarm signal transferred in S12 may also indicate the number of people that are requested for help. Then, the server searches in S14 for the corresponding number of nearest user equipment to which the alarm messages are sent in S15. The server may also transmit the alarm signal to a monitoring centre where emergency procedures are coordinated and/or to authorities such as the police, fire department, etc.

In an embodiment, the server establishes in S15 a bidirectional voice communication link between the user equipment 122 that requested for help and the user equipment 128 to which the alarm was conveyed. The bidirectional voice communication link may be routed through the server, or the server may transmit a control message to the user equipment 128 so as to open a direct device-to-device Bluetooth voice connection with the user equipment 122 requesting for help. In response to such a control message, the user equipment 128 starts a Bluetooth voice connection establishment procedure so as to call the user equipment 122. When the voice communication link is routed through the server, the server may control the call establishment by calling to both pieces of user equipment 122, 128 and linking the voice connection between them.

The processes or methods described in FIGS. 3 and 4 may also be carried out in the form of a computer process (or processes) defined by one or more computer programs. A computer program stored in the transmitter tag may configure the control circuitry of the tag to control the radio transmission of a unique ID and other radio transmissions and to perform an analysis of environmental properties, as described above. A computer program stored in the user equipment may configure the control circuitry of the user equipment to scan for the unique IDs, to communicate with the server, and to interact with the user, as described above. A computer program stored in the server may configure a processor of the server to communicate with the user equipment, transmitter tags, one or more private base stations, and other devices so as to track the location of the user equipment in the area, to receive and handle alarms and other events, and to route connections and messages, as described above. The computer programs may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, each computer program may be executed in a single electronic digital processing unit or it may be distributed amongst a number of processing units.

Figure 5:
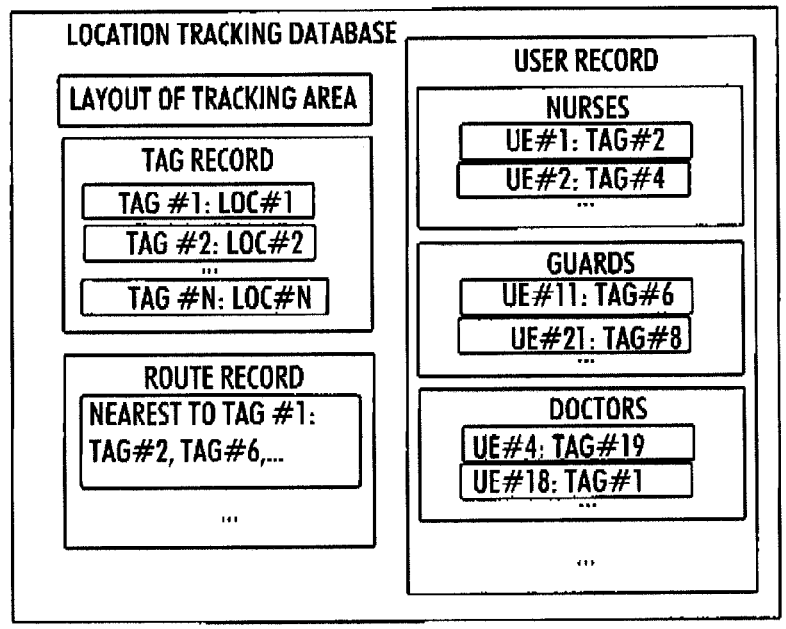
FIG. 5 illustrates an exemplary structure of a database storing data for the location tracking according to an embodiment of the invention.

FIG. 5 illustrates an exemplary structure of the location tracking database utilized for tracking the locations of the user equipment and their users. The database may store the layout of the area where the location tracking is carried out. The server may access the layout when an operator accesses the server and wishes to see the layout of the area and the location of the user equipment in the area. The server may then load the layout from the database, load the locations of the tags from the tag record and map the user equipment units to their currently linked tags/locations in the layout for display to the operator. The server may be accessible over a conventional Ethernet connection and a web interface, so installation of specific software in a client device is not necessary.

Additionally, the database may include a tag record comprising an entry for each tag. The entry of a given tag comprises an identifier of the tag and a physical location of that tag in the form of a room number, coordinates, etc. The tag record is created during the installation phase of the system, when the tags are disposed throughout the area. When a new tag is added to the area, the tag record is updated with the location of the new tag. Similarly, when a tag is removed, the tag record is updated by removing a record for the removed tag. The server may access the tag record when it transmits the location information in the alarm message in S15.

The database may also comprise a route record that comprises for each tag, information on the nearest neighboring tags in an order. For example, a route record entry for tag#1 may comprise the IDs of the other tags in the order of the shortest route to tag#1. As a consequence, when the server accesses the database in S14, it finds the route record entry of the tag currently linked to the user equipment requesting for help and starts transmitting the alarm message to the tags in the order defined in the found route record, as described above. When a new tag is added to the area or a tag is removed, the route record entry of each tag may be updated so that the nearest tag information is up-to-date.

The database also comprises a user record comprising entries for the user equipment being tracked. The entry of a given user equipment comprises an identifier of that user equipment and an identifier of a tag currently linked to the user equipment, i.e., the tag on whose coverage area the user equipment currently resides. The server accesses these entries when it updates the location in S4 and when it determines the location of the user equipment requesting for help in S13. The user equipment may be categorized in the user record on the basis of a determined criterion. For example, the user equipment may be categorized on the basis of professions of their users, as illustrated in FIG. 5. User equipment carried by nurses may belong to one category, user equipment carried by guards may belong to a different category, and so on for other professions (doctors, janitors, etc.). Such categorization may be utilized in conveying the alarm to an appropriate person to prevent that when a nurse requests help from another nurse, the alarm is conveyed to the nearest nurse and not to the nearest janitor, for example. In S14, when finding the nearest user equipment the server may first check the route record for the nearest tag, then access the appropriate category in the user record to find out whether or not there are any user equipment linked to the nearest tag in that category. If there is, the server carries out S15. Otherwise, the server accesses the route record to find the next closest tag and again checks the appropriate category of the user record for whether or not the next nearest tag is associated with any user equipment of correct category, and so on. The alarm signal transferred in S12 may comprise information on which type of help is requested (help from nurse, doctor, guard, etc.), and the server knows to access the correct category in the user record. Unless otherwise specified in the alarm signal in S12, the server may access the category to which the user equipment requesting for help belongs.

The categorized user records may also be utilized for other purposes. For example, group messaging or group calls may be carried out. A user desiring to contact a certain group may operate his/her user equipment so as to call or send a message to a certain group or category. The call or the message is then transmitted to the server which routes the call or message to the corresponding group by first checking the user equipment belonging to that group from the user record and, then, forwarding the call or message to the user equipment. Consequently, the user does not have to send an individual call message to every member of the group but only a single call or message to the server which then forwards the call or message to the appropriate user equipment. Additionally (or alternatively), the tracking system enables calling a certain location without knowing which member of the staff is currently in that location. The user may initiate a call to a given location, e.g. a room, and the call is first routed to the server. The server then accesses the tag record to determine the tag at that location. Then, the server checks the user record to determine whether or not there is any user equipment currently linked to that tag. If there is, the server routes the call to that user equipment. If not, the server accesses the route record to discover the tag nearest to the tag of the location being called and, then, checks the user record for user equipment linked to the nearest tag. In this manner, the procedure may continue until the user equipment closest to the desired location is discovered.

Figure 6A:
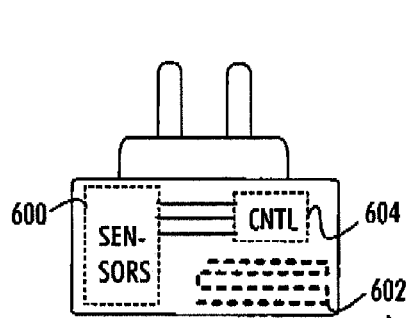
FIGS. 6A and 6B illustrate embodiments of a transmitter tag and user equipment.
Figure 6B:
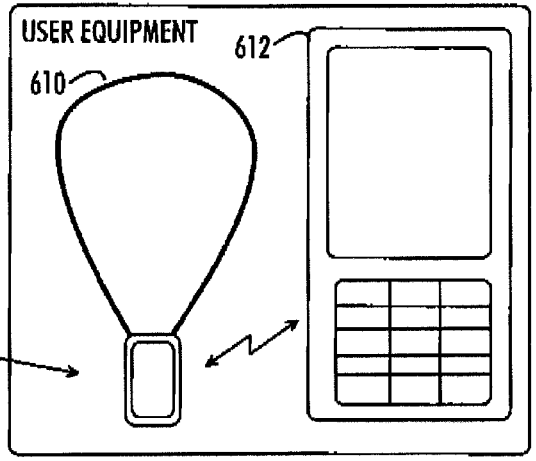

FIGS. 6A and 6B illustrate embodiments of the transmitter tag and the user equipment. Referring to FIG. 6A, the tag comprises an antenna 602 and a control circuitry 604 including a (Bluetooth) transmission circuitry within a casing and configured to broadcast the unique ID of the tag, as described above. The tag may include an interface through which transmission power and/or antenna radiation pattern settings of the tag may be manipulated so as to obtain the desired setting in the installation phase.

The casing may be produced into a form of a power plug to be inserted into a regular (AC) power socket commonly available in any room and building. The casing may be solid so that it has no wires or the like extending from the casing. The casing itself may be placed into the power socket so that the power plug is inserted into a power outlet in a wall, ceiling, etc. The casing may also contain a power socket so that another electrical device may utilize the same power socket as the tag, and the AC voltage is conveyed from the power plug part of the tag to the power socket part of the tag. The tag may take its operating power from the AC, and for that purpose the tag may also include a power adapter. Therefore, the tag requires no battery or the like, but a battery may be provided as a power backup in case of an electrical blackout. The transmitter tag may also comprise a memory for storing a computer program controlling the operation of the control circuitry. The memory may also function as a non-volatile memory for storing parameters and other information needed in the operation of the transmitter tag.

In an embodiment, the tag comprises one or more sensors 600 measuring environmental properties around the location where the sensor is located. The sensor(s) measure a given environmental property and output measurement signals indicative of the environmental property to the control circuitry 604. The environmental properties measured by the one or more sensors comprise at least one of the following: temperature, smoke, fire, toxic gases, pressure, humidity, water leakage, sounds, and images (video or still images). Implementation of such sensors is known as such in the corresponding technological fields and, therefore, a detailed description of the structures of such sensors is omitted. The sensors 600 may also include a camera which may be a conventional camera or a thermal camera. The control circuitry 604 receiving signals from the sensors 600 may be configured to analyze the signals and compare them with references so as to detect deviations from allowed ranges or undesired events. For example, the control circuitry 604 may compare the received temperature signal with an allowed threshold range, and if the temperature is outside the allowed range, the control circuitry may control the transmission circuitry to transmit an alarm message through the antenna 602 to the server through the private base station network. Alternatively, the tag may transmit the alarm message through the wired network established through the power sockets. In such an embodiment, the utilization of the electrical outlets provides two advantages: power supply and communication connection. The alarm message may include information of the type of the alarm (low/high temperature in this case). In other embodiments, a smoke sensor may provide a signal when it senses a sufficient amount of smoke. Then, the control circuitry 604 may monitor for a signal from the smoke detector and, in response to the reception of such a signal, a corresponding alarm will be transmitted to the server. In another embodiment, the tag only forwards the measurement data to the server, and the server is configured to process the received measurement data so as to detect an event in the environmental properties, and to conduct an alarm in response to the detected event triggering the alarm.

In an embodiment, the tag is equipped with a motion detector configured to detect motion in the room or area where the tag is located. The motion detector may be based on the detection of infra-red radiation or another means for detecting motion in the coverage area of the motion detector. Particularly, the motion detector may be configured to detect the presence of human-sized figures. Upon detecting the person (or motion), the transmitter tag is configured to inform the server about the detection of the presence of the person. Upon reception of such a message from a transmitter tag, the server is configured to check whether or not user equipment is/are currently linked to the location of the transmitter tag from which the message informing the detection of the person was received. If no user equipment is currently linked to the location of the transmitter tag, the server is configured to determine an unauthorized access in the area and to carry out an alarm. In another embodiment, the communication circuitry of the transmitter tag including the motion detector may be equipped with reception capability. Let us assume that all the user equipment units that are being tracked are also configured to periodically broadcast Bluetooth inquiry responses or to otherwise transmit their unique IDs. When the motion detector of the tag outputs a signal indicating detected movement to the control circuitry 604, the control circuitry activates the communication circuitry to scan for unique IDs stored in a memory of the tag (not shown). If at least one known unique ID is detected, the tag determines that the source of the motion is a member of the staff, and it takes no action. If no known unique ID is detected, the control circuitry controls the communication circuitry to transmit an alarm message to the server so as to inform of the presence of an unauthorized person in the area. The server may then convey the alarm to guards, police, and/or another instance in the manner described above in connection with FIGS. 4 and 5. Such an embodiment of the tag is particularly useful in rooms where drugs or other corresponding material are being stored. The system may be used to detect authorized and unauthorized persons in the room or area.

The communication connection between the server and the tag may be bidirectional, and the server may instruct the tag to activate the camera (if equipped) in response to reception of the alarm message from the tag. Then, the tag may activate the camera and stream still or video images over the communication connection to the server which may route the image(s) to an operator. Additionally, the bidirectional communication connection between the tag and the server may be used for establishing a bidirectional voice communication link between the server and the tag, and the server may route the voice communication link to another tag or user equipment. In this manner the transmitter tags may be used for voice communications and/or for sending voice announcements to selected locations in the premises of the location tracking system.

In an embodiment, the transmitter tags are configured to transfer external measurement information received from a measurement device to the server. Let us assume that the location tracking system is installed in a hospital. The user equipment and a transmitter tag may communicate with each other so as to transfer measured patient-related data to the server. The measured data may be heart rate, blood pressure, or any other data measured from the patient by using medical instruments. The measured data may be transferred to the transmitter tag from the user equipment as input by the user or directly from the medical instrument(s) automatically, if the medical instruments are provided with the capability to process the measurement data electronically and to transmit the measurement data to the transmitter tag. The transmitter tag is used as a bridge to provide the communication connection with the server. A message transmitted to the server may include IDs of the transmitter tag so as to pinpoint the location where the measurement was carried out, an ID of the patient so as to link the patient and the measurement data, the ID of the user equipment so as to determine the person who conducted the measurement and the actual measurement data. Upon reception of the message, the server stores the received measurement data and the IDs in a medical record of the patient.

FIG. 6B illustrates an embodiment of the user equipment. The user equipment includes in this embodiment a personal radio communication device 610 and a cell phone 612. The personal radio communication device is constructed into a form of a necklace to be worn around the neck of the person carrying it, but it may equally be a wrist device, belt clip, a key chain or a key frame or another object to be carried in a pocket, etc. The personal radio communication device 610 is equipped with Bluetooth or another short range radio communication circuitry. For that purpose the personal radio communication device includes the corresponding radio transceiver circuitry enabling the radio communication, control circuitry controlling the operation of the personal radio communication device, and a user interface to receive inputs from the user through a keypad or buttons, to enable the voice communication as described above, and to display information to the user. The user interface may include, in addition to the buttons/keys, a display unit, a loudspeaker and a microphone (and optionally a camera) integrated into the personal radio communication device 610 or as a peripheral device, and a display unit. The control circuitry controls the operation of the user interface and the radio transceiver circuitry to carry out operations described above in connection with the user equipment. The operation of the control circuitry may be defined by one or more computer program products stored in a memory of the personal radio communication device 610. The personal radio communication device 610 may operate as a Bluetooth transceiver and, thus, be configured to detect the unique IDs the tags transmit and to transmit the detected tag IDs to the server over the Bluetooth connection with the private base station network. Alternatively, the personal radio communication device may use the cell phone 612 as a modem and transmit the detected IDs to the server over a public mobile telecommunication system. In such a case, the cell phone sees the personal radio communication device as a Bluetooth accessory device, and the personal radio communication device establishes the connection to the server by using a Bluetooth dial-up networking profile or another corresponding profile when using other radio access technologies. In preferred embodiments, the user equipment as described herein may be seen to comprise the personal radio communication device 610 with or without the cell phone 612, but the cell phone without the personal electronic device may also be form the user equipment.

The personal radio communication device may include an emergency button, and when the user presses the emergency button, this triggers the personal radio communication device to execute steps S11 and S12 of FIG. 4. In connection with pressing the emergency button, the personal radio communication device may be configured to provide the user with a menu so as to enable the user to select the type of the alarm request, i.e., whether help from guards, nurses, a doctor, etc. is required. Accordingly, the alarm will be routed to an appropriate destination. The personal radio communication device 610 may also include a man-down sensor configured to detect whether the person carrying the personal radio communication device 610 has fallen and lies motionless. Such man-down sensors are known in the art, e.g. ones based on mercury switches sensing body motions of the person wearing the unit. Upon detection of no motion, the control circuitry of the personal radio communication device may be configured to carry out an automatic alarm without user interaction, i.e. to carry out step S12 without S11.

The personal radio communication device may also include a motion detection circuitry configured to detect when the personal radio communication device is moving. Upon detection of the movement by the motion detection circuitry, the personal radio communication device may be configured to power up. Upon detection of no movement for determined time, the personal communication device may enter a power-save mode where selected functionalities of the device are shut down. At least the motion detection circuitry may, however, be kept operational.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

In an embodiment, the system further comprises an access control sub-system comprising a plurality of access-controlled entries, e.g. doors, and an access-control database storing information on the user equipment and access rights for each piece of user equipment. The access control database may be stored in the same physical location as the location tracking database, or it may reside in a different location. In any case, the server has an access to the access-control database. The user equipment functions as a key to the access control sub-system, and the server is configured to grant or deny access of the at least one personal radio communication device to entries in the access control sub-system. For example, in case of an emergency, the server may check the location of all user equipment and grant each user equipment access to all doors on the shortest exit route. The server may also transmit guidance information guiding the user to the shortest exit or to another determined location in the premises of the location tracking system so that the evacuation may be carried out as quickly as possible. Further with respect to the guidance, the guidance to a certain location and monitoring the user as he/she travels to the location may be carried out in other cases than in the emergency. For example, the user may select a location where he/she wishes to go in the premises of the location tracking system, and the server may provide route information as how to find a way there. In another embodiment where the user is scheduled to be at a certain location at a certain time, the server may alert the user through the user equipment about the scheduled event and provide guidance to that location.

With respect to the access control, when the user tries an entry through an access-controlled door, the user equipment functioning as the key and the lock in the door interact. The interaction may include exchange of identification and/or access data. If the identification or the access data is correct, the door opens. The server may communicate with the lock or the user equipment so as to deny or grant the user equipment to access a given door. The system is thus capable of granting or denying the access in real time. This may be utilized in many ways. For example, if the server detects given user equipment in a room to which it does not have an access (unauthorized entry), it may immediately deny the user equipment the access through any door and call an alarm. Similarly, access to a given entry may be granted on the fly without a need to bring the user equipment for reprogramming. The reprogramming may be carried out over the communication connection between the user equipment and the server.

In an embodiment, the server is further configured to count a time of presence of a given personal electronic device from time durations when the personal radio communication device is detected in the area where the location tracking is carried out. The location tracking may be used for monitoring and storing working time of each member of the staff on the basis of the time duration the staff member is detected in the premises of the area where the location tracking is carried out. The working time may be stored on a daily basis in the user record. The server may each day store a time when a given personal radio communication device is detected in the area and a time when the personal radio communication device is assumed to have left the area, e.g. when no more unique identifiers is received from the personal radio communication device and when the personal radio communication device's last link is to a location at an entrance/exit. From these stored times, calculating the duration of presence of the personal radio communication device in the area may be calculated with simple mathematics, and thus derived working hours per day may be stored in the user record.

Figure 7:
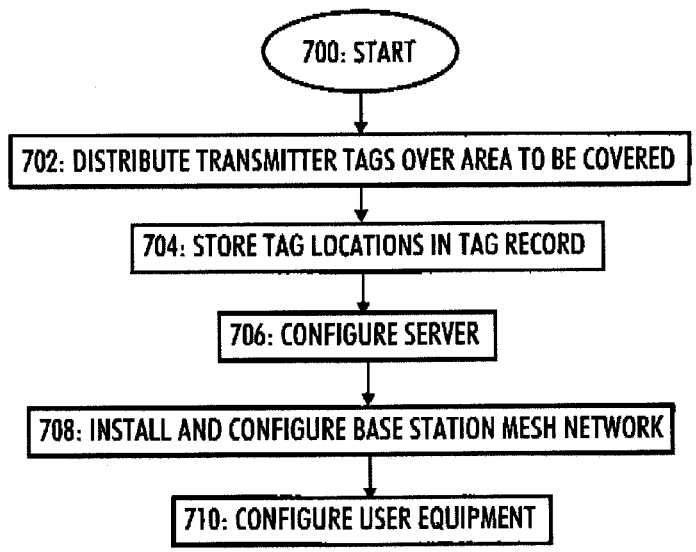
FIG. 7 is a flow diagram illustrating process for installing and configuring the system according to an embodiment of the invention.

FIG. 7 illustrates a method for installing the system according to the embodiments of the invention. The installation process starts in block 700. In block 702, a plurality of above-described transmitter tags are disposed in distributed physical locations to cover an area where location tracking is to be carried out. The transmitter tags may be plugged into AC power sockets, as described above. Transmit powers and/or radiation patterns of each transmitter tag may also be adjusted in block 702 so that the radio coverage areas of the transmitter tags cover the whole area where the location tracking is to be carried out. The coverage may be verified by activating the transmitter tags and moving with a receiver capable of detecting the unique IDs transmitted by the tags. If at least one tag is detected in all the tested locations, the coverage may be determined to be as desired. If there are uncovered areas, the transmit powers and/or radiation patterns of the nearby transmitter tags may be increased so as to improve the coverage. In block 704 each physical location where a transmitter tag is disposed in block 702 is stored in a database (the tag record in the location tracking database) as being associated with a unique identifier of a radio transmitter tag disposed in that physical location. The user equipment may be utilized in the execution of block 704. The user equipment may be a special type of user equipment configured to operate in an installation mode. The execution of block 704 may be controlled by the server, and the user equipment may be in continuous communication connection with the server. The server may send to the user equipment instructions to go to a first room and to press a button. The instructions are conveyed to the user via the user interface. When the user enters the first room and presses the button, the user equipment is configured to carry out steps S1 to S3, i.e., to scan for unique IDs and transmit the detected (one or more) IDs to the server. The server may then link the ID of the strongest tag with the first room and, when multiple tags have been detected, store a notification that those tags are also detected in that room. The latter information may be used to improve the resolution of the location tracking, as described above. Then, the server instructs the user equipment to go to a second room and so on until all the rooms/hallways/locations in the premises have been covered. In consequence, the database now comprises information that links the physical locations to the transmitter tags. In block 706, the above-described server is configured to have access to the database and to utilize the database so as to enable the location tracking, i.e., to operate in the above-described manner. In block 708, the above-described base station network is installed and configured to form the wireless mesh network and to route connections to the server. Block 708 may include physical installation of the private base stations in determined locations and programming them to communicate with each other so as to form the mesh network. Additionally, one or more of the private base stations may be configured to communicate directly with the server. In block 710, user equipment devices are configured for operation in the above-described manner. Block 710 may include the installation of suitable software in the user equipment.

It will be obvious to a person skilled in the art that, as technology advances, the inventive concept can be implemented in various ways. The invention and its embodiments are not limited to the examples described above but may vary within the scope of the claims.

The invention claimed is:

1. A system for tracking location, comprising:
a plurality of transmitter tags disposed to cover an area where the location tracking is to be carried out, wherein each transmitter tag is configured to radio broadcast a unique identifier by using a Bluetooth radio communication technology;
at least one mobile personal radio communication device configured to scan for Bluetooth radio broadcasts, to detect at least one unique identifier broadcasted by at least one transmitter tag close to the location of the personal radio communication device, and to transmit a message comprising at least one of the detected unique identifiers to a server over a communication connection established between the personal radio communication device and the server; and
the server configured to receive messages from the at least one personal radio communication device, each message comprising at least one unique identifier of at least one transmitter tag, to link a preconfigured location of a given transmitter tag, determined from the received message, with the personal radio communication device from which the message was received so as to determine the location of the personal radio communication device, and to store an identifier of the personal radio communication device as linked to the determined location of the personal radio communication device,
wherein a first personal radio communication device is configured to send an alarm signal to the server, and wherein the server is further configured to receive the alarm signal and to convey the alarm signal to a nearest second mobile personal radio communication device of the location tracking system,
wherein the server comprises a memory storing information indicating the closest neighboring transmitter tags for any transmitter tag in an order of the shortest distance via access routes through which a human being can move, and wherein the server is configured to determine the nearest other mobile personal radio communication device to be a personal radio communication device having the shortest distance via access routes through which a human being can move to the first personal radio communication device.

2. The system of claim 1, wherein the server is further configured, in response to the reception of the alarm signal from the first personal radio communication device, to check the current location of the first personal radio communication device by determining the transmitter tag to whose unique identifier the first personal radio communication device is currently linked, to determine a second transmitter tag that is closest to the determined location of the first personal radio communication device and that is currently linked to the second personal radio communication device, and to alarm the second personal radio communication device.

3. The system of claim 1, wherein the server is further configured to establish a bidirectional voice communication link between the first personal radio communication device and the second personal radio communication device in response to the alarm signal received from the first personal radio communication device.

4. The system of claim 1, wherein the server is further configured to categorize a plurality of personal radio communication devices into categories, and to verify that the second personal radio communication device belongs to a correct category before sending the alarm, wherein the server is configured to determine the correct category from the alarm signal received from the personal radio communication device.

5. The system of claim 1, wherein the server is further configured to categorize a plurality of personal radio communication devices into categories, receive a communication request from a personal communication device, wherein the communication request indicates the category of a target of the communication request and/or a target location of the communication request, to determine a target personal communication device belonging to the category and/or residing currently in the location indicated in the received communication request, and to route the communication request to the target personal radio communication device.

6. The system of claim 1, wherein the server is configured to provide the at least one personal radio communication device with a candidate list comprising unique identifiers of the transmitter tags that are to be scanned, the unique identifiers in the candidate list being determined on the basis of the current location and/or movement of each personal radio communication device, and wherein the at least one personal radio communication device is configured to receive the candidate list from the server and to scan for the unique identifiers comprised in the candidate list.

7. The system of claim 1, wherein at least some of the plurality of transmitter tags comprise:
a radio communication circuitry configured to at least transmit radio signals including a unique identifier of the transmitter tag;
at least one sensor configured to measure at least one environmental property; and
a control circuitry configured to receive measurement signals from the at least one sensor, to process the received measurement signals into measurement data, and to transmit the received measurement data to the server,
and wherein the server is configured to process the received measurement data so as to detect an event in the environmental properties, and to conduct an alarm in response to the detected event triggering the alarm.

8. The system of claim 7, wherein the environmental properties comprise at least one of the following: temperature, smoke, fire, toxic gases, pressure, humidity, water leakage, motion, audio, images, and video.

9. The system of claim 1, further comprising an access control sub-system comprising a plurality of access-controlled entries, wherein the at least one personal radio communication device functions as a key to the access control sub-system, and wherein the server is configured to grant or deny access of the at least one personal radio communication device to entries in the access control sub-system.

10. The system of claim 1, wherein at least some of the plurality of transmitter tags comprises a detection circuitry configured to detect a presence of a person in a coverage area of the transmitter tag, and to inform the server about the detection of the presence of the person, and wherein the server is configured to check whether or not at least one personal radio communication device is currently linked to the location of the transmitter tag informing of the detected person and to carry out an alarm if no personal radio communication devices is currently linked to the location of the transmitter tag.

11. The system of claim 1, further comprising a plurality of base stations configured to establish a wireless mesh network covering the area where the location tracking is to be carried out and to route signals between the server and the at least one personal radio communication device.

12. The system of claim 1, wherein the at least one personal radio communication device is configured to determine the closest transmitter tag by transmitting an inquiry message with varying transmission power levels until a response to the inquiry message is received from one transmitter tag and to transmit the unique identifier of the closest transmitter tag to the server.

13. A server comprising:
at least one processor; and
at least one memory including a computer program code, wherein the at least one memory and the computer program code are configured, with the at least one processor, to cause the server to:
operate in a location tracking system utilizing Bluetooth radio communication technology and comprising a plurality of transmitter tags disposed to cover an area where the location tracking is to be carried out, wherein each transmitter tag is configured to radio broadcast a unique identifier by using the Bluetooth radio communication technology, and at least one mobile personal radio communication device configured to scan for Bluetooth radio broadcasts, to detect at least one unique identifier broadcasted by at least one transmitter tag close to the location of the personal radio communication device, and to transmit a message comprising at least one of the detected unique identifiers;
receive messages from the at least one personal radio communication device, each message comprising at least one unique identifier of at least one transmitter tag, to link a preconfigured location of a given transmitter tag, determined from the received message, with the personal radio communication device from which the message was received so as to determine the location of the personal radio communication device, and to store an identifier of the personal radio communication device as linked to the determined location of the personal radio communication device,
wherein a first personal radio communication device is configured to send an alarm signal to the server, and wherein the server is further configured to receive the alarm signal and to convey the alarm signal to a nearest second mobile personal radio communication device of the location tracking system,
wherein the server comprises a memory storing information indicating the closest neighboring transmitter tags for any transmitter tag in an order of the shortest distance via access routes through which a human being can move, and wherein the server is configured to determine the nearest other mobile personal radio communication device to be a personal radio communication device having the shortest distance via access routes through which a human being can move to the first personal radio communication device.

14. A mobile personal radio communication device of a location tracking system, comprising:
at least one processor; and
at least one memory including a computer program code, wherein the at least one memory and the computer program code are configured, with the at least one processor, to cause the personal radio communication device to:

scan for Bluetooth radio broadcasts;

detect at least one unique identifier broadcasted by at least one transmitter tag close to the location of the personal radio communication device, wherein the at least one transmitter tag disposed to cover an area where the location tracking is to be carried out, wherein each transmitter, tag is configured to radio transmit a unique identifier, transmit a message comprising at least one of the detected unique identifiers to a server over a communication connection established between the personal radio communication device and the server so as to enable the server to track location of the mobile personal radio communication device, wherein a first personal radio communication device is configured to send an alarm signal to the server, and wherein the server is further configured to receive the alarm signal and to convey the alarm signal to a nearest second mobile personal radio communication device of the location tracking system, wherein the server comprises a memory storing information indicating the closest neighboring transmitter tags for any transmitter tag in an order of the shortest distance via access routes through which a human being can move, and wherein the server is configured to determine the nearest other mobile personal radio communication device to be a personal radio communication device having the shortest distance via access routes through which a human being can move to the first personal radio communication device.

* * * * *